United States Patent
Ward et al.

(10) Patent No.: US 8,757,211 B2
(45) Date of Patent: Jun. 24, 2014

(54) FLOW CONTROL VALVE

(75) Inventors: Christopher Ward, Sycamore, IL (US); Peter Malone, Glenview, IL (US)

(73) Assignee: Hydac Fluidtechnik GmbH, Sulzbach/Saar (DE)

( * ) Notice: Subject to any disclaimer, the term of this patent is extended or adjusted under 35 U.S.C. 154(b) by 0 days.

(21) Appl. No.: 13/261,468

(22) PCT Filed: Apr. 11, 2011

(86) PCT No.: PCT/EP2011/001786
§ 371 (c)(1),
(2), (4) Date: Dec. 13, 2012

(87) PCT Pub. No.: WO2011/124394
PCT Pub. Date: Oct. 13, 2011

(65) Prior Publication Data
US 2013/0082200 A1    Apr. 4, 2013

(30) Foreign Application Priority Data
Apr. 10, 2010 (DE) .................. 10 2010 014 496

(51) Int. Cl.
*F16K 17/04* (2006.01)
(52) U.S. Cl.
USPC ..................... 137/871; 137/625.48
(58) Field of Classification Search
USPC .......... 137/625.11, 625.48, 625.68, 870, 871; 251/129.07
See application file for complete search history.

(56) References Cited

U.S. PATENT DOCUMENTS

| | | | | |
|---|---|---|---|---|
| 2,675,831 A | * | 4/1954 | Jacques | 137/625.48 |
| 4,243,062 A | * | 1/1981 | Shelton | 137/62 |
| 5,377,720 A | * | 1/1995 | Stobbs et al. | 137/625.65 |
| 5,778,932 A | * | 7/1998 | Alexander | 137/625.65 |
| 5,918,635 A | * | 7/1999 | Wang et al. | 137/625.65 |
| 7,073,533 B2 | * | 7/2006 | Bruck et al. | 137/625.68 |
| 7,845,370 B2 | * | 12/2010 | Cook et al. | 137/625.65 |
| 2010/0243085 A1 | * | 9/2010 | Van Weelden et al. | 137/544 |

FOREIGN PATENT DOCUMENTS

| | | |
|---|---|---|
| DE | 196 04 317 | 8/1997 |
| DE | 199 49 234 A1 | 6/2001 |
| DE | 101 33 990 A1 | 3/2002 |
| DE | 10 2004 012 711 A1 | 10/2005 |
| DE | 10 2004 017 088 A1 | 10/2005 |

(Continued)

*Primary Examiner* — Craig Schneider
*Assistant Examiner* — R. K. Arundale
(74) *Attorney, Agent, or Firm* — Roylance, Abrams, Berdo & Goodman LLP

(57) ABSTRACT

A flow control valve, particularly an electromagnetic proportional directional flow control valve (1), has a valve housing (2), in which a control piston (3) is guided to be displaced axially. The control piston (3) actuates at least one fluid-conducting connection (4) between a fluid inlet (5) and an outflow opening (6). An actuator part, in particular an armature (8), can be actuated by an actuator, particularly a proportional magnet, and acts on the control piston (3). A pressure detecting piston (9) serves for the action of the actuator part on the control piston (3). The fluid inlet (5) is connected in a fluid-conducting manner by a pressure detecting channel (11) to a pressure detecting chamber (12) such that the fluid pressure prevailing in the pressure detecting chamber (12) loads the pressure detecting piston (9) and the control piston (3) with a force (F) in the direction of relief of the actuator, and a further fluid-conducting connection (4') between the fluid inlet (5) and a further outflow opening (6') is actuated.

21 Claims, 2 Drawing Sheets

(56) References Cited

FOREIGN PATENT DOCUMENTS

| DE | 10 2006 039 488 A1 | 3/2007 |
| DE | 10 2005 058 846 A1 | 6/2007 |
| DE | 10 2008 013 271 A1 | 9/2009 |
| EP | 1 439 285 A1 | 7/2004 |
| FR | 2 805 492 A1 | 8/2001 |

* cited by examiner

FLOW CONTROL VALVE

FIELD OF THE INVENTION

The invention relates to a flow control valve, particularly of an electromagnetic proportional directional flow control valve, having a valve housing, in which a control piston is guided to be displaced axially. The control piston actuates at least one fluid-conducting connection between a fluid inlet and an outflow opening. An actuator part, in particular an armature, can be actuated by an actuator, in particular a proportional solenoid, and acts on the control piston.

BACKGROUND OF THE INVENTION

Flow control valves, in particular in the form of electromagnetic directional flow control valves, have the function of setting the volume flow to a constant value independently of the pressure differential and the viscosity of a fluid. Depending on the design of the respective flow control valve, the volume flow can be controlled on the influent flow side or the return side of a connected hydraulic consumer. Flow control valves with adjustable volume flow can be implemented by proportional solenoids as the actuators such that a proportional solenoid can produce a parallel shift of the characteristic of the valve concerned.

In this context, the volume flow is adjusted continuously by the proportional solenoid that is actuated by an electronic power amplifier. The proportional valves can be position controlled or force controlled. Usually, a control piston, designed as a sliding piston, acts, subject to the action of the magnetic force of the proportional solenoid, against a compression spring such that an orifice cross section is correspondingly enlarged or decreased. The pressure independence of the volume flow is achieved by a differential pressure valve (pressure compensator) that provides a constant pressure differential at the metering orifice and that is normally downstream of this metering orifice.

A directional valve having this function is disclosed DE 196 04 317 A1. This valve has a hollow cone-shaped valve seat that forms a valve opening range with a valve element. In this case, the valve element has a spherical segmental section. The radius of the spherical segmental section and the opening angle of the hollow cone-shaped valve seat are established such that a sealing region is formed, when the valve element sits on the valve seat. The valve element is guided in a movable manner in a valve body, with the valve body having a corresponding inner circumferential surface that has a more or less uniform diameter over the entire length of the valve element.

In particular, such flow control valves of a seat-type design have at least two problem areas. First, the power demand for the proportional solenoid is relatively high. Second, such valves are difficult to actuate with a certain degree of precision in the extreme opening ranges. The electromagnetic directional valve, disclosed in the document, has a flat characteristic, so that the solenoid drive force is evened out in relation to an identical actuating current over almost the entire range of the valve stroke. This feature is implemented by setting the solenoid drive force such that it has a flat characteristic to make the control of the valve opening degree easier. However, this feature has the drawback that the solenoid drive force is relatively high with respect to a change in a range, in which the current value is correspondingly large. This results from the relationship that the solenoid drive force is proportional to the square of the current value. Therefore, the magnitude of change in the solenoid drive force becomes larger in relation to the same magnitude of change in the current.

The flow rate of a fluid to be controlled with such valves tends to change abruptly in relation to a small change in the actuating current in a range, in which the opening degree of the electromagnetic proportional flow control valve is small. Such flow control valves of the seat-type design have the problem that it is difficult to achieve an accurate flow rate control in a range with a low flow rate, at which the flow rate to be controlled is low.

In contrast, the prior art flow control valves of the sliding valve type design generally have a non-minimized power demand and/or a non-minimized size of the proportional solenoid.

SUMMARY OF THE INVENTION

An object of the present invention is to provide an improved flow control valve providing a small overall size and, at the same time, a precise volume flow control over the entire anticipated operating range. Additionally, the energy demand of this flow control valve is minimized.

Such object is basically achieved by a flow control valve having a pressure detecting piston acting on the actuator part on the control piston. The fluid inlet is connected in a fluid-conducting manner to a pressure detecting chamber by a pressure-detecting duct such that the fluid pressure, prevailing in the pressure detecting chamber applies a force to the pressure detecting piston and the control piston in the direction of a relief of the actuator. An additional fluid-conducting connection between the fluid inlet and an additional outflow opening is actuated. In total, this approach provides an electromagnetically operable flow control valve that functions well as a 3-way proportional flow control valve carrying out the volume flow control for at least two hydraulic consumers.

The pressure detecting piston of the flow control valve is loosely connected to the control piston. As a result, forces act on the pressure detecting piston in the direction of a relief of the proportional solenoid. In addition, the necessary actuating forces for the control piston are reduced, because its projection surface is decreased, compared to the known valves of the seat type design, in the fluid flow direction by the cross-sectional area of the pressure detecting piston extending into the control piston. As a result, the flow control valve according to the invention has three design measures in the smallest space. First, the necessary actuating forces are reduced. Thus, the energy consumption is reduced for its valve element in the form of the control piston, that is, by the reverse action of the fluid flow on the pressure detecting piston through the application of fluid to the rear side of the pressure detecting piston in the pressure detecting chamber and the associated reduction of the influent flow and/or pressurized projection surface or end face of the control piston itself. Second, the flow control valve according to the invention has an additional fluid-conducting connection between its fluid inlet and an additional outflow opening, as a result of which volume flow control is made possible for two hydraulic consumers.

The flow control valve according to the invention provides an electromagnetically operable flow control valve having markedly flat characteristic curves. The solenoid drive force of the flow control valve is then evened out in relation to an identical actuating current over the entire range of the valve stroke. As a result, a characteristic of curves that is almost 100% linear can be achieved.

The outflow openings in the valve housing are arranged in an advantageous way. When the free flow cross section of the one outflow opening is enlarged due to a movement of the control piston, the free flow cross section of the respectively other outflow opening is decreased by the control piston. Preferably, the flow control valve is designed as a priority valve such that the one outflow opening forms a media port to supply a connectable consumer of higher priority with a flowable medium. Inversely, the other outflow opening forms an additional media port to supply a consumer of lower priority. The result of the design measures is a flow control valve in the manner of a priority valve having the smallest energy demand and a minimized installation space requirement.

Especially preferred, the flow control valve is provided with a control piston with at least two rows of passage openings that are spaced axially apart from each other. One of the rows is assigned the one outflow opening. The other row is assigned the other outflow opening. In total, the results are symmetrical flow patterns inside the flow control valve, in particular inside its control piston.

The passage openings and the outflow openings preferably have a plurality of rows of drill holes assigned to each other and axially spaced apart from each other relative to the longitudinal or actuating axis of the valve. The drill holes lie diametrically opposite each other in the respective row. In total, the results are symmetries in the flow control valve relative to its longitudinal axis. The fabrication of the flow control valve is then simplified. Harmonic flow guides and flow transitions are then achieved inside the valve body.

The control surfaces of the control piston, to which fluid pressure is effectively applied, and the control surfaces of the pressure detecting piston yield, when pulled away from each other, a remaining control surface, to which fluid pressure is applied to introduce a force to the two piston. The result is a relief for the proportional solenoid. Without the pressure detecting piston with its pressure-effective detecting piston rear side, all of the fluid pressure on the fluid inlet side of the valve would be available on the proximal front side of the valve element or the control piston. That proportional solenoid would then have to generate very high actuating forces for the valve element, and respectively the control piston. The proportional solenoid inside the valve device would then need to be large in size and have a correspondingly high energy demand.

The use of the pressure detecting piston serves to reduce, as explained, the necessary actuating forces, so that proportional solenoids small in size suffice for the actuating functions with a correspondingly low power demand. Moreover, the pressure detecting piston also supports the modular design of the flow control valve, because the valve components, including the proportional solenoid, can be installed in standardized size gradations to cover a wide range of performance classes of fluid or media flows to be controlled. The average person skilled in the field of valve engineering would be surprised to find that the actuating force of the proportional solenoid can be significantly reduced through the use of a pressure detecting piston and a fluid guide on its side facing the proportional solenoid.

Preferably a respective pressure detecting duct produces a permanently fluid-conducting connection between the fluid inlet and the pressure detecting chamber. At the same time, preferably the pressure detecting duct at least partially, preferably completely, penetrates the pressure detecting piston in the axial direction. Additionally, for this purpose, the pressure detecting duct, arranged laterally in the valve housing, is guided past the control piston. In individual cases, such pressure detecting ducts can also be used jointly with a valve construction.

A precise control and actuating characteristic for the flow control valve can be achieved, if, as preferred, the pressure detecting piston penetrates the control piston such that the pressure detecting piston defines a metering orifice with a passage opening of the control piston in the area of the free front side of the pressure detecting piston. This metering orifice points in the direction of the fluid inlet side of the flow control valve.

Especially preferred, the metering orifice is formed by the inner wall parts of the control piston. The metering orifice may be found between the two outflow openings in any movement position of the control piston. In this context, the pressure detecting duct of the pressure detecting piston extends through the metering orifice to form a radial distance. When viewed in the axial direction of the flow control valve according to the invention, the free front-side end of the pressure detecting duct empties into the other fluid-conducting connection between the fluid inlet and the other outflow opening in any movement position of the control piston.

In an additional especially preferred form of the flow control valve according to the invention, the armature can be axially displaced by the proportional solenoid and does not act directly on the control piston. Rather, the pressure detecting piston, which partially or totally penetrates the control piston in the axial direction, serves as an intermediate member between the armature and the control piston. The pressure detecting piston is actuated at least indirectly by the armature and is adjusted as a function of the measured pump pressure at the fluid inlet of the control piston. The opening cross section of the fluid-conducting connection is then adjusted. The proportional solenoid with its armature can also be replaced with any other actuator with its actuator part, be it in the form of a hydraulic working cylinder actuation, be it in the form of an electric spindle drive, or the like. In such cases, the result is also a reduction in installation space and in the energy required for the respective actuator system that is used.

The pressure detecting piston can be loosely connected to the control piston by a drive plate. In particular, the drive plate then takes with it the control piston in the active direction of the energized proportional solenoid or a resetting device for the control piston. In any case, those pistons can be moved relative to each other in the opposite direction of movement of the armature of the proportional solenoid and the pressure detecting piston.

The proportional solenoid is designed advantageously in the manner of a "pushing magnet." When the proportional solenoid is in its non-energized state, the control piston is moved by a resetting device into a position in which the one fluid-conducting connection is blocked and the other fluid-conducting connection is at least partially opened. Preferably, the proportional solenoid is designed as a "pulling magnet." When the proportional solenoid is in its non-energized state, the control piston is moved by a resetting device into a position in which the one fluid-conducting connection is at least partially open and the other fluid-conducting connection is blocked. Thus, a simple modification of just the proportional solenoid alone allows the inventive flow control valve in the manner of a priority valve to be produced as a "pushing magnet" or as a "pulling magnet" with two different kinds of switching positions in the non-energized state of the proportional solenoid.

The pressure detecting piston has a largest end face that is equal to preferably about one-fourth of the end face described by the control piston.

The pressure detecting piston widens in the diameter, preferably from its side facing the fluid inlet of the flow control valve to the side facing the armature. The control piston is designed, as stated above, as a sliding piston. In this case, a metering orifice opening, which faces the fluid inlet of the flow control valve, has preferably an inside diameter that is about twice as large as the diameter of the pressure detecting piston in this area.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure and which are diagrammatic and not drawn to scale.

DETAILED DESCRIPTION OF THE INVENTION

Figure 1:
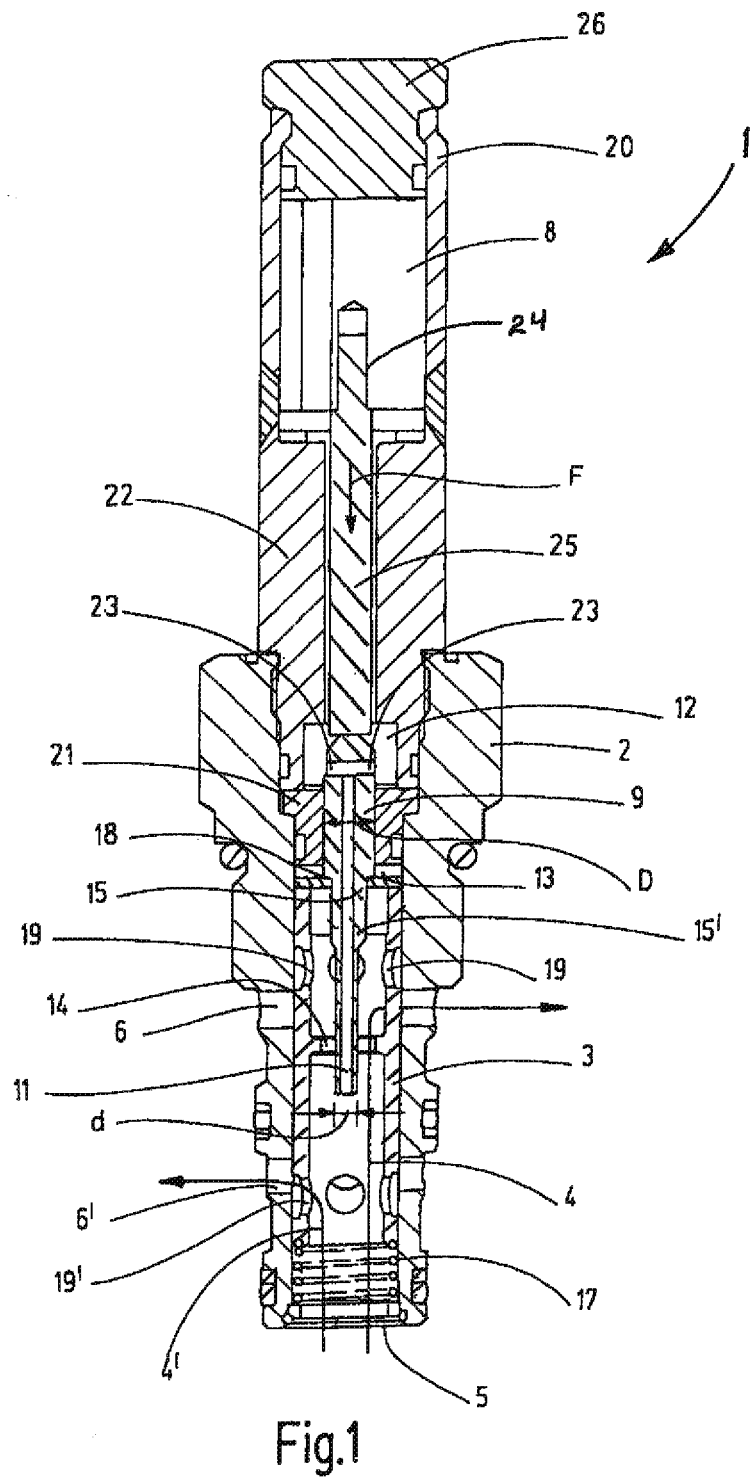
FIG. 1 is a side elevational view in section of a flow control valve according to a first exemplary embodiment of the invention.

FIG. 1 shows the key components of an electromagnetically operable 3-way proportional flow control valve 1 capable of holding a hydraulic fluid volume flow from a hydraulic fluid pump (not illustrated) or any other pressure feed to at least one of two hydraulically connected consumers (not illustrated) more or less constant, independently of any pressure fluctuations that might occur. The electromagnetic 3-way flow control valve 1 can control the volume flow on the influent flow side or the return side of the hydraulic consumers (not illustrated), for example, in the form of working cylinders of a construction machine or the like.

The valve, hereinafter referred to as the flow control valve 1, has a valve housing 2 configured as a screw-in cartridge. The lower, axial end of the valve housing 2 has a central fluid inlet 5 and a plurality of radial outflow openings 6, 6', of which two are shown in pairs as drill holes in FIG. 1. A sleeve-shaped control piston 3, designed as a sliding piston, is guided such that, as a valve element, it can be displaced in a drill hole in the valve housing 2. The control piston 3 is held by a cylindrical or conical resetting device 17, designed as a compression spring, on its end opposite a proportional solenoid (not shown in detail) on the other end of the valve housing 2. An actuator part of the proportional solenoid that is formed, in particular, as an armature 8, acts on the control piston 3 at its end facing the proportional solenoid.

A pressure detecting piston 9 serves for the actuator part to act on the control piston 3. The pressure detecting piston 9 connects the fluid inlet 5 to a pressure detecting chamber 12 through a pressure detecting duct 11. The resulting fluid pressure prevailing in the pressure detecting chamber 12 applies a force F to the pressure detecting piston 9 and the control piston 3 in the direction of a relief of the actuator. The flow control valve 1 has fluid-conducting connections 4, 4' between the fluid inlet 5 and the outflow openings 6, 6'. When the free flow cross section of the outflow opening 6' is enlarged in the control positions of the control piston 3, where the two outflow openings 6, 6' are traversed by flow, the free flow cross section of the outflow opening 6 decreases.

Figure 2:
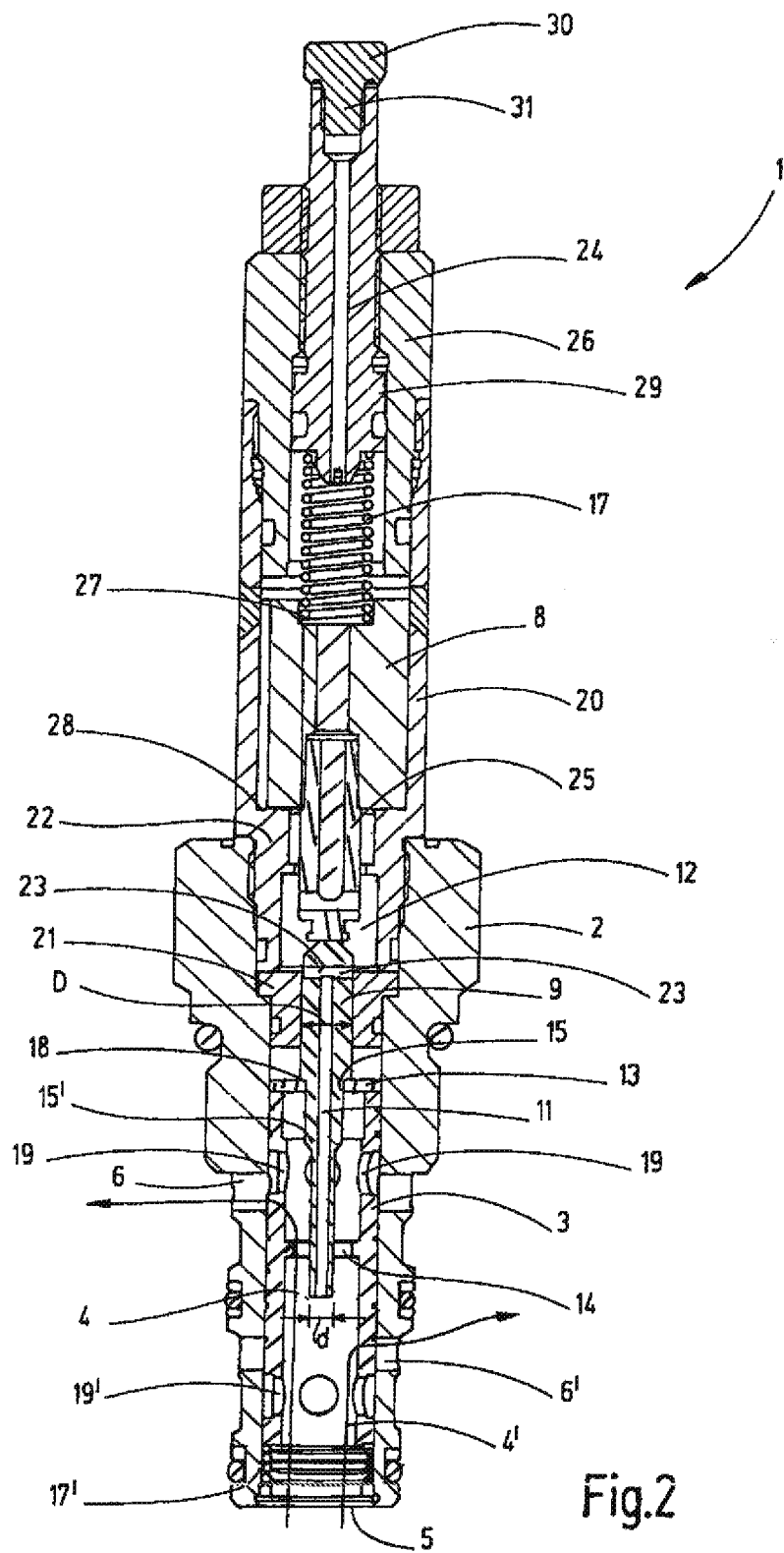
FIG. 2 is a side elevational view in section of a flow control valve according to a second exemplary embodiment of the invention.

The exemplary embodiments of the flow control valve 1, shown in FIG. 1 and in FIG. 2, are designed as priority valves, each with an outflow opening 6 or 6' forming a media port to supply a connectable consumer of higher priority with the fluid. The other outflow opening 6' or 6, respectively, can form relative to the other an additional media port to feed a consumer of lower priority. However, a different connection assignment with a correspondingly modified priority is also possible. In the exemplary embodiments shown in FIGS. 1 and 2, the respective outflow opening 6, 6' is formed by a row of drill holes along the periphery of the valve housing 2. The control piston 3 in turn has at least two rows of axially spaced passage openings 19, 19'. One or the first row of outflow opening 6 and the other or second row of outflow opening 6' is assigned to the respective row of passage openings 19, 19'.

The result is the fluid-conducting connection 4 between the fluid inlet 5 and the row of drill holes relating to the outflow opening 6 and the fluid-conducting connection 4' between the fluid inlet 5 and the row of drill holes relating to the other outflow opening 6'. In the exemplary embodiments depicted in FIGS. 1 and 2, the passage openings 19, 19' and the outflow openings 6, 6' include most preferably of a plurality of rows of drill holes assigned to each other, which are axially spaced relative to the longitudinal or actuating axis of the valve 1 and are divided into rows. Depending on the movement position of the control piston 3, the passage openings 19, 19' permit the passage of flowable medium or fluid into the respective fluid-conducting connection 4, 4' or partially or totally block the respective fluid-conducting connection 4, 4'. In these control positions of the control piston 3, the selected distances between the outflow openings 6, 6' and the passage openings 19, 19' allow a flowable medium to flow into both fluid-conducting connections 4, 4' in predefinable amounts.

The control surfaces of the control piston 3, to which fluid pressure is effectively applied, and the control surfaces of the pressure detecting piston 9 yield, when the two pistons 3, 9 are pulled away from each other, a remaining control surface has fluid pressure applied thereto and introduces a force to the two pistons 3, 9. The result of that force is a relief for the proportional solenoid. This force relief allows the use of a proportional solenoid that is smaller in size than is the case in the prior art solutions that dispense with the pressure detecting piston 9 according to the invention. Furthermore, such a relief is energy saving, because the power consumption for the proportional solenoid is less. In this respect, the largest cross section of the pressure detecting piston 9 decreases the projection surface of the control piston 3. The resulting remaining control surface leads to the force introduction that reduces the load on the proportional solenoid.

The pressure detecting duct 11 produces a permanently fluid-conducting connection between the fluid inlet 5 and the pressure detecting chamber 12. At the same time, the pressure detecting duct 11 penetrates the pressure detecting piston 9 in the axial direction. It can also be advantageous to arrange the pressure detecting duct 11 laterally in the valve housing 2 and to guide it past the control piston 3 (not illustrated). The control piston 3 is partially penetrated, as shown, by the pressure detecting piston 9 in the axial direction, so that the pressure detecting piston 9 defines a metering orifice 14 with a passage opening of the control piston 3 in the region of the free front side of the pressure detecting piston 9. The metering orifice 14 is formed by the inner wall parts of the control piston 3 and may be found between the outflow openings 6, 6' in any movement position of the control piston 3. In this context, the pressure detecting duct 11 of the pressure detecting piston 9 extends through the metering orifice 14 at a radial distance. When viewed in the axial direction of the flow control valve 1, the free front-side end of the pressure detecting duct 11 empties into the other or second fluid-conducting connection 4' between the fluid inlet 5 and the other outflow opening 6' in any movement position of the control piston 3. The armature 8 can be axially displaced by the proportional solenoid and acts permanently on the control piston 3 by the pressure detecting piston 9, as an intermediate member. The pressure detecting piston 9 is loosely connected to the control piston 3 by a drive plate 13 to introduce a force to the control piston 3. The drive plate 13 is provided with an opening 18.

In FIG. 1, the flow control valve 1 is constructed with a proportional solenoid in the manner of a "pushing magnet." When the proportional solenoid is in its non-energized state, the control piston 3 is moved by a resetting device 17 into a position in which the one fluid-conducting connection 4 is blocked and the other fluid-conducting connection 4' is at least partially opened.

Then, the control piston 3 opens and closes the fluid-conducting connections 4, 4' by applying force to the armature 8 (also referred to as the armature of a magnet). Armature 8 is moved by the proportional solenoid in a pole tube 20. The proportional solenoid is actuated by a computer unit (not shown in detail) and an associated sensor system. That actuation is common for flow control valves, such that further details need not be described. The pressure detecting chamber 12 is arranged between a guide piece 21 for the pressure detecting piston 9 and a pole tube base 22. The pressure detecting piston 9 penetrates with a widened region having a diameter D the guide piece 21 forming a rigid axially sliding bearing for the pressure detecting piston 9. The guide piece 21 and the pole tube base 22 are secured in the valve housing 2 in a sealing manner. The pressure detecting piston 9 extends through the control piston 3 with a diameter that gradually decreases downward, as viewed in FIG. 1. The pressure detecting duct 11 is formed centrally, in an axially centered manner, preferably in the form of a drill hole, which empties into at least two radially extending tap holes 23. The pressure detecting piston 9 has an additional difference in diameter 15 at the opening 18 of the drive plate 13, so that the diameter D, which the piston has in its region guided by the guide piece 21, decreases to the diameter at the opening 18.

This decrease in diameter allows a positive locking engagement of the pressure detecting piston 9 and a connection to the control piston 3. The connection permits the control piston 3 to move relative to the pressure detecting piston 9. At the same time, the resetting device 17 pushes the control piston 3 against the difference in diameter 15 of the pressure detecting piston 9 by the drive plate 13, against which the control piston 3 rests loosely with its outer circumference. Pistons 3, 9 are held permanently in engagement with each other in any position of movement.

An additional difference in diameter 15' is present at the pressure detecting piston 9 inside its region in the control piston 3. In this case, the outside diameter of the pressure detecting piston 9 decreases to its smallest size d, so that it projects as a hollow needle in the direction of the fluid inlet 5. In the initial position, the pressure detecting piston 9 can be loaded with a predefinable actuating force on its pressure detecting chamber-side end by a tappet 25 connected to the armature 8 by a setting thread 24.

A pressure compensator is formed by the arrangement of the pressure detecting piston 9 with the control piston 3. The side of the control piston 3 facing the fluid inlet 5 has a correspondingly high pressure upstream of the metering orifice 14. This high pressure passes over into a comparatively lower pressure value due to the metering orifice 14 and is available at the rear side of the control piston 3 and is correspondingly available on the side of the drive plate 13 that faces away from the fluid inlet 5 due to an engagement slot (opening 18), which is not shown in detail, on the drive plate 13. If the proportional solenoid is suitably energized, then the resetting device 17 formed as the compression spring, is at least partially compressed.

In this embodiment of the electromagnetic flow control valve 1, the pressure prevailing in the pressure detecting chamber 12 and available at the pressure-effective control surfaces of the pressure detecting piston 9 by the pressure detecting drill hole 11 and the tap holes 23 supports the force effect of the proportional solenoid with a force F in the same direction as the actuating force of the proportional solenoid. This force relief allows the use of a proportional solenoid that is smaller in size than is the case in the prior art solutions that dispense with the pressure detecting piston 9 according to the invention. Furthermore, such relief is energy saving, because the power consumption for the proportional solenoid is less. In this respect, the largest cross section of the pressure detecting piston 9 decreases the projection surface of the control piston 3. The resulting remaining control surface leads to the force introduction that reduces the load on the proportional solenoid.

The respective outflow opening 6, 6' forms with the respective passage opening 19, 19' assigned to each other the control orifices of the flow control valve 1. Owing to the play-restricted tappet guide for the tappet 25 in the pole tube base 22 and owing to a passage drill hole in the magnet armature 8, the pressure prevailing in the pressure detecting chamber 12 is also available at the armature 8 in a pressure compensating manner. This feature guarantees a smooth operation of the armature/tappet arrangement. The armature 8, guided in the pole tube 20, is provided outward in the conventional manner with a closure cap 26 connected to the pole tube 20 of the flow control valve 1 in the manner of bead.

FIG. 2 shows an additional design variant of the electromagnetic proportional directional flow control valve 1, where the key components of the flow control valve 1 and, in particular, the components installed in its valve housing 2 are more or less identical to those of the embodiment of FIG. 1. The same reference numerals and the related descriptions apply to the identical components. In contrast to the exemplary embodiment shown in FIG. 1, the armature 8 does not act here on the pressure detecting piston 9 in a pushing manner. Rather, it acts in a pulling manner in the direction of releasing a displacement path provided for the control piston 3. In the embodiment of the flow control valve 1 shown in FIG. 2, a switching position of the control piston 3 is shown that is partially open in relation to the fluid-conducting connection 4. In this case, the proportional solenoid (not shown in detail) is not energized.

According to FIG. 2, the pressure detecting piston 9 is pushed, in the viewing direction downward with the control piston 3 and, in particular, subject to the action of a compression spring 27. Spring 27 forms the resetting device 17 in the FIG. 2 exemplary embodiment and exerts a force on the armature 8 of the magnet. The resetting device 17 of FIG. 1, is designated as 17' in FIG. 2. In this case, the spring force of the compression spring 17' is smaller than the spring force of the compression spring 27. The compression spring 17' only has the function of "clamping" the control piston 3 without play in its respective control position. In this case, the armature rests against a bottom end stop 28 in the lowest position of movement. To adjust the actuating force of the compression spring 27, an adjusting spindle 29 is guided in a rotatable manner in the valve arrangement by a setting thread 24. In addition, the upper free end of the spindle 29 is closed with a venting screw 30, which engages with a screw segment 31 in an assigned internal thread at the free end of the adjusting spindle 29. Such arrangement allows the dead current to be adjusted by the thread 24. In the illustrated movement position of the control piston 3, the fluid-conducting connection 4' is blocked, and the fluid-conducting connection 4 is partially opened. If the fluid pressure in the fluid inlet 5 increases, the pressure-effective surfaces in conjunction with a controlled energizing of the proportional solenoid move the armature 8 upward, as viewed in FIG. 2. As a result, the overlapping area of the passage opening 19' with the outflow opening 6' increases. At the same time the overlapping area of the passage opening 19 with the outflow opening 6 decreases.

While various embodiments have been chosen to illustrate the invention, it will be understood by those skilled in the art that various changes and modifications can be made therein without departing from the scope of the invention as defined in the appended claims.

What is claimed is:

1. A flow control valve, comprising:
   a valve housing having a fluid inlet and first and second outflow openings;
   a control piston guided for axial displacement in said valve housing and selectively actuating first and second fluid-conducting connections between said fluid inlet and said first and second outflow openings, respectively, said control piston having piston control surfaces to which fluid pressure is effectively applied;
   a proportional solenoid having an armature acting on said control piston;
   a pressure detecting piston serving for actuation of said armature on said control piston and having detecting control surfaces yielding when said pistons are pulled away from each other; and
   a pressure detecting chamber in said valve housing and in fluid communication with said fluid inlet via a pressure detecting duct, fluid pressure prevailing on a remaining control surface of said control piston in said pressure detecting chamber applying a force to said pressure detecting piston and said control piston in a direction providing relief to said proportional solenoid.

2. A flow control valve according to claim 1 wherein
   when a free flow cross section of said first outflow opening is enlarged, a free flow cross section of said second outflow opening is decreased by said control piston.

3. A flow control valve according to claim 1 wherein
   said first outflow opening forms a first fluid port for supplying fluid to a higher priority connectable consumer; and
   said second outflow opening forms a second fluid port supplying fluid to a lower priority connectable consumer.

4. A flow control valve according to claim 1 wherein
   said control piston comprises first and second rows of passage openings that are axially spaced along a longitudinal axis of said valve housing, said first and second rows forming said first and second outflow openings, respectively.

5. A flow control valve according to claim 4 wherein
   said passage openings are drill holes with said drill holes in each row being diametrically opposite one another.

6. A flow control valve according to claim 1 wherein
   said pressure detecting duct provides a permanent fluid-conducting connection between said fluid inlet and said pressure detecting chamber, extends axially through said pressure detecting piston, is arranged laterally in said valve housing relative to said control piston and extends axially beyond said control piston.

7. A flow control valve according to claim 1 wherein
   said pressure detecting piston penetrates said control piston; and
   said pressure detecting piston defines a metering orifice with a passage opening of said control piston adjacent a free front side of said pressure detecting piston.

8. A flow control valve according to claim 7 wherein
   said metering orifice is formed by inner wall parts of said control piston;
   said metering orifice is between said first and second outflow openings in any movement position of said control piston; and
   said pressure detecting duct extends through said metering orifice forming a radial distance therebetween.

9. A flow control valve according to claim 1 wherein
   a free front-side end of said pressure detecting duct empties into said second fluid-conducting connection between said fluid inlet and said second outflow opening in any movement position of said control piston.

10. A flow control valve according to claim 1 wherein
    said armature is axially displaceable by said proportional solenoid and acts permanently on said control piston via said pressure detecting piston acting as an intermediate member therebetween.

11. A flow control valve according to claim 1 wherein said pressure detecting piston is loosely connected to said control piston via a drive plate.

12. A flow control valve according to claim 1 wherein
    said proportional solenoid comprises a pushing magnet, such that, when said proportional solenoid is in a non-energized state, said control piston is moved by a resetting device into a position in which said first fluid-conducting connection is blocked and said second fluid-conducting connection is at least partially opened.

13. A flow control valve according to claim 1 wherein
    said proportional solenoid comprises a pulling magnet such that, when said proportional magnet is in a non-energized state, said control piston is moved by a resetting device into a position in which said first fluid-conducting connection is at least partially open and said second fluid-conducting connection is blocked.

14. A flow control valve, comprising:
    a valve housing having a fluid inlet and first and second outflow openings;
    a control piston guided for axial displacement in said valve housing and selectively actuating first and second fluid-conducting connections between said fluid inlet and said first and second outflow openings, respectively;
    an actuator having an armature acting on said control piston;
    a pressure detecting piston serving for actuation of said armature on said control piston and penetrating said control piston, said pressure detecting piston defining a metering orifice with a passage opening of said control piston adjacent a free front side of said pressure detecting piston; and
    a pressure detecting chamber in said valve housing and in fluid communication with said fluid inlet via a pressure detecting duct, fluid pressure prevailing in said pressure detecting chamber applying a force to said pressure detecting piston and said control piston in a direction providing relief to said actuator.

15. A flow control valve according to claim 14 wherein
    said actuator comprises a proportional solenoid.

16. A flow control valve, comprising:
    a valve housing having a fluid inlet and first and second outflow openings;
    a control piston guided for axial displacement in said valve housing and selectively actuating first and second fluid-conducting connections between said fluid inlet and said first and second outflow openings, respectively;

an actuator having an armature acting on said control piston;

a pressure detecting piston serving for actuation of said armature on said control piston;

a pressure detecting chamber in said valve housing and in fluid communication with said fluid inlet via a pressure detecting duct, fluid pressure prevailing in said pressure detecting chamber applying a force to said pressure detecting piston and said control piston in a direction providing relief to said actuator; and a metering orifice formed by inner wall parts of said control piston, said metering orifice being between said first and second outflow openings in any movement position of said control piston, said pressure detecting duct extending through said metering orifice forming a radial distance therebetween.

17. A flow control valve according to claim 16 wherein said actuator comprises a proportional solenoid.

18. A flow control valve, comprising:

a valve housing having a fluid inlet and first and second outflow openings;

a control piston guided for axial displacement in said valve housing and selectively actuating first and second fluid-conducting connections between said fluid inlet and said first and second outflow openings, respectively;

an actuator having an armature acting on said control piston;

a pressure detecting piston serving for actuation of said armature on said control piston; and a pressure detecting chamber in said valve housing and in fluid communication with said fluid inlet via a pressure detecting duct, fluid pressure prevailing in said pressure detecting chamber applying a force to said pressure detecting piston and said control piston in a direction providing relief to said actuator; and a free front-side end of said pressure detecting duct emptying into said second fluid-conducting connection between said fluid inlet and said second outflow opening in any movement position of said control piston.

19. A flow control valve according to claim 18 wherein said actuator comprises a proportional solenoid.

20. A flow control valve, comprising:

a valve housing having a fluid inlet and first and second outflow openings;

a control piston guided for axial displacement in said valve housing and selectively actuating first and second fluid-conducting connections between said fluid inlet and said first and second outflow openings, respectively;

an actuator having an armature acting on said control piston;

a pressure detecting piston serving for actuation of said armature on said control piston and being loosely connected to said control piston via a drive plate; and a pressure detecting chamber in said valve housing and in fluid communication with said fluid inlet via a pressure detecting duct, fluid pressure prevailing in said pressure detecting chamber applying a force to said pressure detecting piston and said control piston in a direction providing relief to said actuator.

21. A flow control valve according to claim 20 wherein said actuator comprises a proportional solenoid.

* * * * *